(12) United States Patent
Kim

(10) Patent No.: US 11,769,060 B2
(45) Date of Patent: *Sep. 26, 2023

(54) METHOD FOR DETERMINING OPTIMAL ANOMALY DETECTION MODEL FOR PROCESSING INPUT DATA

(71) Applicant: MakinaRocks Co., Ltd., Seoul (KR)

(72) Inventor: Ki Hyun Kim, Yongin-si (KR)

(73) Assignee: MakinaRocks Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,051

(22) Filed: Mar. 11, 2022

(65) Prior Publication Data

US 2022/0198213 A1 Jun. 23, 2022

Related U.S. Application Data

(63) Continuation of application No. 17/083,205, filed on Oct. 28, 2020, now Pat. No. 11,308,366.

(30) Foreign Application Priority Data

Oct. 28, 2019 (KR) .................. 10-2019-0134215
Feb. 24, 2020 (KR) .................. 10-2020-0022451

(51) Int. Cl.
  *G06N 3/088* (2023.01)
  *G06N 3/084* (2023.01)
  (Continued)

(52) U.S. Cl.
  CPC ........... *G06N 3/088* (2013.01); *G06F 18/211* (2023.01); *G06F 18/214* (2023.01);
  (Continued)

(58) Field of Classification Search
  CPC .... G06V 10/762; G06V 10/82; G06V 10/764; G06F 18/211; G06F 18/217;
  (Continued)

(56) References Cited

U.S. PATENT DOCUMENTS 9,454,958 B2 * 9/2016 Li ........................... G10L 15/16
11,112,980 B2 * 9/2021 Song ..................... G06F 3/0631
(Continued)

FOREIGN PATENT DOCUMENTS

KR  10-2018-0055708 A   5/2018
KR     10-1940029 B1   1/2019
KR  10-2019-0083127 A   7/2019

*Primary Examiner* — Utpal D Shah
(74) *Attorney, Agent, or Firm* — Seed IP Law Group LLP

(57) ABSTRACT

Disclosed is a computer program stored in a computer readable storage medium according to an exemplary embodiment of the present disclosure. When the computer program is executed by one or more processors of a computing device, the computer program may perform operations for managing a model, and the operations may include: generating an anomaly detection model including a plurality of anomaly detection sub models having a pre-learned network function through using a plurality of training data subsets included in a training data set; determining one or more anomaly detection sub models for calculating an input data among the generated anomaly detection sub models; and judging whether or not the anomaly is existed in the input data through using the one or more determined anomaly detection sub models.

19 Claims, 7 Drawing Sheets

(51) Int. Cl.
*G06V 10/762* (2022.01)
*G06V 10/764* (2022.01)
*G06V 10/82* (2022.01)
*G06F 18/2413* (2023.01)
*G06F 18/211* (2023.01)
*G06F 18/214* (2023.01)
*G06F 18/21* (2023.01)
*G06F 18/25* (2023.01)

(52) U.S. Cl.
CPC ........ *G06F 18/217* (2023.01); *G06F 18/2413* (2023.01); *G06F 18/251* (2023.01); *G06N 3/084* (2013.01); *G06V 10/762* (2022.01); *G06V 10/764* (2022.01); *G06V 10/82* (2022.01)

(58) Field of Classification Search
CPC .. G06F 18/2413; G06F 18/214; G06F 18/251; G06N 3/084
See application file for complete search history.

(56) References Cited

U.S. PATENT DOCUMENTS

| | | | |
|---|---|---|---|
| 11,157,837 B2* | 10/2021 | Qi | G06N 5/01 |
| 2016/0342888 A1* | 11/2016 | Yang | G06V 10/454 |
| 2017/0024849 A1* | 1/2017 | Liu | G06N 3/045 |
| 2018/0174001 A1* | 6/2018 | Kang | G06F 18/214 |
| 2019/0378050 A1* | 12/2019 | Edkin | G06N 20/20 |
| 2020/0019852 A1 | 1/2020 | Yoon et al. | |
| 2021/0224599 A1* | 7/2021 | Tajima | G05B 23/024 |
| 2022/0004152 A1* | 1/2022 | Kim | G06N 3/084 |
| 2022/0004935 A1* | 1/2022 | Lakshmanan | G06N 7/01 |

* cited by examiner

METHOD FOR DETERMINING OPTIMAL ANOMALY DETECTION MODEL FOR PROCESSING INPUT DATA

CROSS-REFERENCE TO RELATED APPLICATIONS

This application claims priority to and the benefit of U.S. patent application Ser. No. 17/083,205, filed Oct. 28, 2020, which claims priority to Korean Patent Application No. 10-2020-0022451 filed in the Korean Intellectual Property Office on Feb. 24, 2020, and claims priority to and the benefit of Korean Patent Application No. 10-2019-0134215 filed in the Korean Intellectual Property Office on Oct. 28, 2019, the entire contents of which applications are incorporated herein by reference.

BACKGROUND

Technical Field

The present disclosure relates to an artificial intelligence technology field, and more particularly, to anomaly detection using an artificial intelligence technology.

Description of the Related Art

As sensor data which can be temporarily or permanently stored and used in a database are accumulated, a research is being conducted on automated processing of monitoring data of lots of industrial equipment. In order to implement a method for judging a state of data, a research on an artificial intelligence technology using an artificial neural network is being conducted.

A deep learning model using the artificial neural network provides a method that can effectively learn a complex non-linear or dynamic pattern, but when data to be processed is changed, there is a technical object for updating models.

Korean Patent Application Laid-Open No. KR10-2018-0055708 discloses an image processing method using artificial intelligence.

BRIEF SUMMARY

The present disclosure has been made in an effort to provide a method for processing a data using artificial intelligence.

An exemplary embodiment of the present disclosure provides a computer program stored in a computer readable medium. When the computer program is executed by one or more processors of a computing device, the computer program may perform operations for managing a model, and the operations may include: generating an anomaly detection model including a plurality of anomaly detection sub models having a pre-learned network function through using a plurality of training data subsets included in a training data set; determining one or more anomaly detection sub models for calculating an input data among the generated anomaly detection sub models; and judging whether or not the anomaly is existed in the input data through using the one or more determined anomaly detection sub models.

In an alternative exemplary embodiment, the operation of determining one or more anomaly detection sub models for calculating an input data among the generated anomaly detection sub models may include an operation of determining one or more anomaly detection sub models for calculating the input data based on at least one of processing tendency of other input data for the plurality of anomaly detection sub models, context information of the input data, or cluster information of the input data.

In an alternative exemplary embodiment, the operation of determining one or more anomaly detection sub models for calculating an input data among the generated anomaly detection sub models may include an operation of determining the anomaly detection sub model for calculating the input data from the anomaly detection sub model that calculates other input data having predetermined relationships with the input data.

In an alternative exemplary embodiment, the other input data may include an input data generated before generating the input data and data generated within time interval predetermined with the input data.

In an alternative exemplary embodiment, the operation of determining the anomaly detection sub model for calculating the input data from the anomaly detection sub model which calculates other input data having predetermined relationships with the input data may include an operation of determining the anomaly detection sub model for calculating the input data from the anomaly detection sub model in which other input data having predetermined relationships with the input data is judged a normal data.

In an alternative exemplary embodiment, the operation of determining one or more anomaly detection sub models for calculating an input data among the generated anomaly detection sub models may include an operation of determining one or more anomaly detection sub model for calculating the input data from the anomaly detection sub model matching to the context information based on the context information of the input data. In an alternative exemplary embodiment, the context information may include an information for associating the input data with a normal data, and at least one of a context indicator for associating the input data with at least one of a manufacturing recipe or a manufacturing equipment, a context characteristic indicator for associating with at least one of a manufacturing recipe characteristic or a manufacturing equipment characteristic of the input data, or a missing characteristic indicator including information for a missing characteristic of the input data.

In an alternative exemplary embodiment, the context information may be matched to at least one of the input data or a training data, and the anomaly detection sub model may be matched to the context information matching to the training data subsets.

In an alternative exemplary embodiment, the operation of determining one or more anomaly detection sub models for calculating an input data among the plurality of generated anomaly detection sub models may include an operation of clustering one or more other input data based on a similarity, and an operation of determining the anomaly detection sub model for calculating the input data from the anomaly detection sub model for calculating other input data included in a cluster having the input data.

In an alternative exemplary embodiment, the operations may further include an operation of clustering a plurality of anomaly detection sub models, and an operation of generating an integrated anomaly detection sub model through integrating one or more anomaly detection sub models included in one cluster.

In an alternative exemplary embodiment, the operation of clustering a plurality of anomaly detection sub models may include an operation of clustering one or more anomaly detection sub models included in the plurality of anomaly detection sub models based on at least one of a context information matched to each anomaly detection sub model, or an input data processing characteristic of each anomaly detection sub model.

In an alternative exemplary embodiment, the operation of clustering a plurality of anomaly detection sub models may include an operation of clustering the anomaly detection sub model based on a judging result for the input data of each anomaly detection sub model.

In an alternative exemplary embodiment, the operation of clustering the anomaly detection sub model based on a judging result for the input data of each anomaly detection sub model may include an operation of clustering the anomaly detection sub model and other anomaly detection sub model to one cluster when the input data and the other input data is associated with each other, and the anomaly detection sub model may judge the input data as a normal data, and the other anomaly detection sub model may judge other input data as the normal data.

In an alternative exemplary embodiment, the operation of clustering the anomaly detection sub model based on a judging result for the input data of each anomaly detection sub model may include an operation of classifying one or more anomaly detection sub models that judges the input data as the normal data into one cluster.

In an alternative exemplary embodiment, the operation of generating an integrated anomaly detection sub model through integrating one or more anomaly detection sub models included in one cluster may include an operation of generating the integrated anomaly detection sub model through an ensemble of one or more anomaly detection sub models included in one cluster.

In an alternative exemplary embodiment, the operation of generating an integrated anomaly detection sub model through integrating one or more anomaly detection sub models included in one cluster may include an operation of generating the integrated anomaly detection sub model through removing at least some among one or more anomaly detection sub models included in one cluster.

In an alternative exemplary embodiment, the operation of generating an integrated anomaly detection sub model through integrating one or more anomaly detection sub models included in one cluster may include an operation of generating the integrated anomaly detection sub model based on a performance test for one or more anomaly detection sub models included in one cluster.

In an alternative exemplary embodiment, the operation of generating an integrated anomaly detection sub model through integrating one or more anomaly detection sub models included in one cluster may include an operation of generating the integrated anomaly detection sub model through retraining one or more anomaly detection sub models included in one cluster.

Another exemplary embodiment of the present disclosure provides a method for detecting anomaly of data using a network function performed by one or more processors. The method may include: generating an anomaly detection model including a plurality of anomaly detection sub models having a pre-learned network function through using a plurality of training data subsets included in a training data set; determining one or more anomaly detection sub models for calculating an input data among the generated anomaly detection sub models; and judging whether or not the anomaly is existed in the input data through using the one or more determined anomaly detection sub models.

Still another exemplary embodiment of the present disclosure provides a computing device. The computing device may include: one or more processors; and a memory storing commands executable in processor, in which the processor may be configured to: generate an anomaly detection model including a plurality of anomaly detection sub models having a pre-learned network function through using a plurality of training data subsets included in a training data set; determine one or more anomaly detection sub models for calculating an input data among the generated anomaly detection sub models; and judge whether or not the anomaly is existed in the input data through using the one or more determined anomaly detection sub models.

According to an exemplary embodiment of the present disclosure, it is possible to provide a method for processing a data using artificial intelligence.

BRIEF DESCRIPTION OF THE SEVERAL VIEWS OF THE DRAWINGS

Various aspects are now described with reference to the drawings and like reference numerals are generally used to designate like elements. In the following exemplary embodiments, for the purpose of description, multiple specific detailed matters are presented to provide general understanding of one or more aspects. However, it will be apparent that the aspect(s) can be executed without the detailed matters.

DETAILED DESCRIPTION

Figure 1:
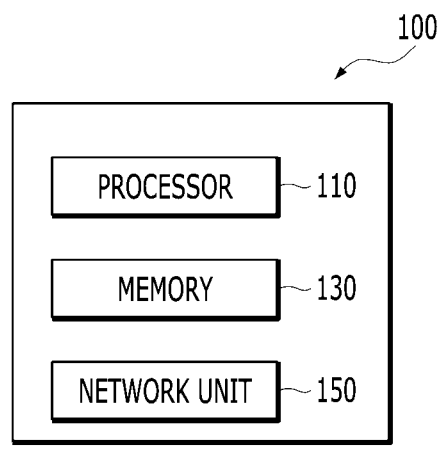
FIG. 1 is a block diagram of a computing device for detecting an anomaly of a data according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component," "module," "system," and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

Moreover, the term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

Further, it should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to additionally recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, structures, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

In the present disclosure, a network function and an artificial neural network and a neural network may be interchangeably used.

FIG. 1 is a block diagram of a computing device for performing a method for judging an anomaly of a data according to an exemplary embodiment of the present disclosure. A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep training, which include a central processing unit (CPU), a general purpose graphics processing unit (GPGPU), a tensor processing unit (TPU), and the like of the computing device. The processor 110 may read a computer program stored in the memory 130 to perform the anomaly detecting method according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DN), extracting a feature in the input data, calculating an error, updating a weight of the neural network using backpropagation, and the like. At least one of the CPU, GPGPU, and TPU of the processor 110 may process learning of a network function. For example, the CPU and the GPGPU may together process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

In an exemplary embodiment of the present disclosure, the computing device 100 may distribute and process a network function by using at least one of the CPU, the GPGPU, and the TPU. Further, in an exemplary embodiment of the present disclosure, the computing device 100 may distribute and process the network function together with other computing devices. A description of detailed contents regarding network function distribution processing of the computing device 100 is specifically discussed in U.S. patent application Ser. No. 15/161,080 (filed on May 20, 2016) and U.S. Ser. No. 15/217,475 (filed on Jul. 22, 2016), which are hereby incorporated by reference in their entirety.

In an exemplary embodiment of the present disclosure, data processed by using the network function may include all kinds of data acquired in an industrial field. For example, the data may include operating parameters of a device for producing a product in a production process of the product, sensor data acquired by an operation of the device, and the like. For example, temperature setting of equipment in a specific process, a wavelength of a laser in the case of a process using the laser, and the like may be included in the type of data processed in the present disclosure. For example, the processed data may include lot equipment history data from a management execution system (MES), data from an equipment interface data source, processing tool recipes, processing tool test data, probe test data, electrical test data, combined measurement data, diagnostic data, remote diagnostic data, post-processing data, and the like and the present disclosure is not limited thereto. As a more specific example, the processed data may include work-in-progress information including approximately 120,000 items for each lot acquired in a semiconductor fab, raw processing tool data, equipment interface information, progress metrology information (e.g., including approximately 1,000 items for each lot), defect information accessible by a yield related engineer, operational test information, sort information (including datalog and bitmap), but the present disclosure is not limited thereto. The description of the type of data is just an example and the present disclosure is not limited thereto. In an exemplary embodiment of the present disclosure, the computing device 100 may preprocess collected data. The computing device 100 may supplement a missing value among the collected data. The computing device 100 may, for example, supplement the missing value with an intermediate value or an average value or delete a column in which a plurality of missing values exists. Further, for example, the computing device 100 may use a subject matter expertise of a manager in data pre-processing by the computing device 100 for matrix completion. For example, the computing device 100 may remove, from collected data, values (e.g., values estimated as a malfunction of a sensor, etc.) which are completely out of a boundary and a limit. Further, the computing device 100 may adjust a value of the data so as to allow the data to similarly have a scale while maintaining characteristics. The computing device 100 may, for example, apply column-based normalization of data. The computing device 100 may simplify processing by removing a column which is not associated with anomaly detection from the data. In an exemplary embodiment of the present disclosure, the computing device 100 may perform an appropriate input data pre-processing method in order to learn the network function for generating the anomaly detection model and facilitate the anomaly detection. A description of specific examples regarding types, examples, preprocessing, conversion, etc., of input data is specifically discussed in U.S. patent application Ser. No. 10/194,920 (filed on Jul. 12, 2002), which is hereby incorporated by reference in its entirety.

Further, the data processed in an exemplary embodiment of the present disclosure may include image data, and may be a data stored in a storage medium of the computing device 100, an image taken by a camera (not illustrated) of the computing device 100, and/or an image transmitted from other computing devices such as an image database, etc., by the network unit 150. Further, in an exemplary embodiment of the present disclosure, the image processed by using the network function may be an image stored in a computer readable storage medium (for example, may include a flash memory, etc., but the present disclosure is not limited thereto). The computing device 100 may receive an image file stored in the computer readable storage medium through an input/output interface (not illustrated).

The processor 110 may generate an anomaly detection model including the network function. The processor 110 trains the network function by using a training data set to generate the anomaly detection model for detecting the anomaly of the data. The training data set may include a plurality of training data subsets. The plurality of training data subsets may include different training data grouped by a predetermined criterion. In an exemplary embodiment of the present disclosure, the predetermined criterion for grouping the plurality of training data subsets may include at least one of a generation time interval of the training data and a domain of the training data. The domain of the training data may include information which becomes a criterion for distinguishing one group of training data from the other group. For example, the training data of the present disclosure may be a sensor data acquired in a semiconductor production process, an operation parameter of a production equipment, etc. In this case, when a setting (e.g., a change of a wavelength of a laser irradiated in a specific process, etc.) of the production equipment is changed in the semiconductor production process (i.e., when there is a change in recipe), the sensor data acquired after the setting change may be included in a different training data subset from the sensor data acquired before the setting change. In a general production process, there may be a plurality of types of normal data by the change of a manufacturing method over time. In an exemplary embodiment of the present disclosure, each of the training data subsets may include a training data grouped by a criterion according to the change of the manufacturing method.

In an exemplary embodiment of the present disclosure, in the case of the semiconductor production process, a normal data which is different for each recipe may be acquired. That is, data acquired in the production process produced by different recipes are different, but all of the data may be the normal data. In an exemplary embodiment of the present disclosure, the plurality of training data subsets may include different types of training data. The plurality of training data subsets may be grouped by the predetermined criteria (e.g., the generation time interval, the domain, the recipe, etc.). Further, the plurality of training data subsets may be grouped by using the generated anomaly detection sub model. For example, when the input data includes a new pattern as a result of processing the input data by a pre-learned anomaly detection sub model, the input data including the new pattern may constitute different training data subsets. The plurality of training data subsets may be grouped by using the anomaly detection sub model. In an exemplary embodiment of the present disclosure, the respective training data subsets may be grouped by the anomaly detection sub model. For example, there is the change of the recipe in the process, but when the input data (i.e., the sensor data acquired in the process generated after the change of the recipe) generated after the change of the recipe are not judged as the new pattern by an old anomaly detection sub model (i.e., when the input data do not have a novelty of a threshold or more), the input data generated before and after the change of the recipe may be grouped as one training data subset. Further, for example, when the input data generated after the change of the recipe in the process is judged as the new pattern by the anomaly detection sub model, the input data generated before the change of the recipe and the input data generated after the change of the recipe may be grouped as separate training data subsets. That is, the input data having the new pattern may be a data including the anomaly, but when there are multiple input data having the new pattern, the input data may be a new normal data. When there are one or more input data having the new pattern, the input data having the new pattern may be the data including the anomaly or the new normal data. Accordingly, when the input data having the new pattern is the new normal data, the processor 110 may classify the input data to the separate training data subset. The disclosure of the training data described above is just an example and the present disclosure is not limited thereto.

The processor 110 may generate the anomaly detection model including the plurality of anomaly detection sub models including the pre-learned network function by using the plurality of training data subsets included in the training data set. In an exemplary embodiment of the present disclosure, the training data subset may be configured by the normal data and a learning in an exemplary embodiment of the present disclosure may be a semi supervised learning. In an exemplary embodiment of the present disclosure, the anomaly detection model may include a plurality of anomaly detection sub models and each of the plurality of anomaly detection sub models may be a sub model learned by using the training data subset. Each anomaly detection sub model may include one or more network functions. The anomaly detection model according to an exemplary embodiment of the present disclosure includes the anomaly detection sub model learned by using each training data subset to detect anomalies of various types of data.

The plurality of anomaly detection sub models may include a first anomaly detection sub model including a first network function pre-learned with a first training data subset constituted by a training data generated during a first time interval and a second anomaly detection sub model including a second network function pre-learned with a second training data subset constituted by training data generated during a second time interval different from the first time interval. For example, the training data subset of the present disclosure may be grouped according to the generation time interval of the training data. For example, when there is the change of the recipe every six months in the semiconductor process, a training data generated for sixth months may constitute one training data subset. The description of the semiconductor process described above is just an example and the present disclosure is not limited thereto. The processor 110 trains the network function of each anomaly detection sub model by using each training data subset to generate the anomaly detection sub model. The processor 110 may generate the first anomaly detection sub model including the first network function learned with the first training data subset and then, generate the second anomaly detection sub model including the second network function learned with the second training data subset when there is the change of the recipe. The first training data subset and the second training data subset may include data acquired in the production process produced by different recipes. Here, an initial weight of the second network function may share at least a part of the pre-learned first network function. Here, the first time interval may be a time interval earlier than the second time interval. Accordingly, the first anomaly detection sub model may be a model generated earlier than the second anomaly detection sub model. When the processor 110 intends to generate the first anomaly detection sub model and then, generate the second anomaly detection sub model based on the change of the recipe, the processor 110 may update the model by reusing a part of a knowledge acquired by the first anomaly detection sub model by using a part of the first anomaly detection sub model for a part of the second anomaly detection sub model.

In an exemplary embodiment of the present disclosure, when a next sub model is generated, a part of a previous model is reused and a knowledge learned in the previous model is not forgotten to lead to a next model, thereby increasing performance of the next mode and reducing an overall learning time. The processor 110 may generate each anomaly detection sub model by using each training data subset and then, generate the anomaly detection model by storing the anomaly detection sub models.

Layers of a predetermined number among layers of the second network function may set the weight of the layer corresponding to the pre-learned first network function as an initial weight.

Layers of a predetermined number from a layer close to an input layer among layers of a dimension reduction network of the second network function may set the weight of the layer corresponding to the pre-learned first network function as the initial weight. The layers of the predetermined number from the input layer of the second network function may be learned by setting the weight of a latest network function as the initial weight. The processor 110 may train the second network function by setting the initial weight of a partial layer close to the input layer of the second network function newly learned as the weight of the first network function already learned. The weight sharing may reduce the amount of computation required for learning the second network function. That is, the initial weight of the layers of the predetermined number close to the input layer of the second network function is not random but set as the weight of the pre-learned network function to use the knowledge of the pre-learned network function in feature extraction (dimension reduction) of the input data and when only restoration (dimension restoration) of the input data by a feature is learned, the learning may be completed, and as a result, the second network function may reduce a time and a computation amount required for entire learning.

Layers of a predetermined number from a layer close to an output layer among layers of a dimension reduction network of the second network function may set the weight of the layer corresponding to the pre-learned first network function as the initial weight. The layers of the predetermined number from the output layer of the second network function may be learned by setting the weight of a latest network function as the initial weight. The processor 110 may train the second network function by setting the initial weight of a partial layer close to the output layer of the second network function newly learned as the weight of the first network function already learned. The weight sharing may reduce the amount of computation required for learning the second network function. That is, the initial weight of the layers of the predetermined number close to the output layer of the second network function is not random but set as the weight of the pre-learned network function to use the knowledge of the pre-learned network function in dimension restoration of the input data and when only dimension reduction of the input data by a feature is learned, the learning may be completed, and as a result, the second network function may reduce a time and a computation amount required for entire learning.

Layers of a predetermined number of the second network function may be initialized for every learning epoch with the weight of the corresponding layer of the pre-learned first network function.

Layers of a predetermined number from the output layer among dimension restoration layers of the second network function may be initialized for every learning epoch with the weight of the corresponding layer of the pre-learned first network function. The processor 110 may initialize the weights of the layers of the predetermined number close to the output layer during the learning of the second network function for every learning epoch with the weight of the corresponding layer of the pre-learned network function. In this case, in one learning epoch, the weight of the dimension restoration layer of the second network function may be changed, thereby affecting the learning of the dimension reduction layer. Through such an operation, the processor 110 fixes the weight of a dimension restoration network of the second network function and trains only a dimension reduction network (feature extraction network) to reduce the time and the computation amount for learning the second network function and use the knowledge in a previous learning.

Layers of a predetermined number from the input layer among dimension reduction layers of the second network function may be initialized for every learning epoch with the weight of the layer corresponding to the pre-learned first network function. The processor 110 may initialize the weights of the layers of the predetermined number close to the input layer during the learning of the second network function for every learning epoch with the weight of the corresponding layer of the pre-learned network function. In this case, in one learning epoch, the weight of the dimension reduction layer of the second network function may be changed, thereby affecting the learning of the dimension restoration layer. Through such an operation, the processor 110 fixes the weight of a dimension reduction network of the second network function and trains only a dimension restoration network to reduce the time and the computation amount for learning the second network function and use the knowledge in the previous learning.

Layers of a predetermined number of the second network function may be fixed to the weight of the corresponding layer of the pre-learned first network function.

Layers of a predetermined number from the output layer among dimension restoration layers of the second network function may be fixed to the weight of the layer corresponding to the pre-learned first network function. Layers of a predetermined number from the input layer among dimension reduction layers of the second network function may be fixed to the weight of the layer corresponding to the pre-learned first network function. Through such weight fixation, the processor 110 trains only some layers of the second network function to reduce the time and the computation amount for learning the second network function and use the knowledge in the previous learning.

The second anomaly detection sub model may be trained with a training data subset (i.e., a training data generated in a process of a recipe different from the training data for training the first network function) different from the training data subset for training the first anomaly detection sub model. The second anomaly detection sub model may be trained with a training data subset (i.e., a training data generated in a process of a recipe different from the training data for training the first network function) different from the training data subset for training the first anomaly detection sub model. The second anomaly detection sub model is trained with a training data including a training data sub model for training a previous anomaly detection sub model, and as a result, the second anomaly detection sub model may inherit the knowledge learned in the first anomaly detection sub model. In this case, in the training data for training the second anomaly detection sub model, sampling ratios of the second training data subset and the first training data subset (i.e., the training data subset for training the previous sub model) may be different from each other. The first training data subset constituted by the training data generated during the first time interval for generating the first anomaly detection sub model may be sampled at a sampling ratio lower than the sampling ratio of the second training data subset for generating the second anomaly detection sub model so that only some of the training data included in the first training data subset is used for training. The first training data subset may be used for training the second anomaly detection sub model, but in this case, the first training data subset may be sampled at the lower sampling ratio than the second training data subset. That is, the training data subset used for training the previous anomaly detection sub model may be used for training a next anomaly detection sub model, but in this case, the training data subset is sampled at a different ratio from the training data subset for training the next anomaly detection sub model to be used for the training. Since a current training data subset and a past training data subset may be used for training the anomaly detection sub model, the anomaly detection sub model may secure processing performance for past data (for example, before the change of the process or recipe), and as a result, it is possible to be free from a problem of oblivion for a model update. Since an importance of the first training data subset may be different from the importance of the second training data subset in training the second anomaly detection sub model, the second anomaly detection sub model may be trained with the second training data subset which is the latest training data to have a higher weight than the first training data subset. For example, when each training data subset includes 100000 data, the second anomaly detection sub model may be trained through all data (i.e., 100000 training data) of the second training data subset and some data (e.g., 10000 training data) of the first training data subset. A difference between the number of training data and the sampling ratio is just an example and the present disclosure is not limited thereto. As described above, in order to generate the anomaly detection sub model, the subset of the training data used for generating the past anomaly detection sub model is used and the sampling ratios of the current training data and the past training data are different from each other, and as a result, the anomaly detection sub model is trained with the current training data to have a higher weight to increase the processing performance for the data (e.g., the process, data after the change of the recipe, data having a different domain, etc.) different from the anomaly detection sub model trained with a past data and minimize the oblivion of the knowledge learned in the past anomaly detection sub model.

In the present disclosure, the pre-learned network function may be learned by setting only the normal data not including the anomaly as the training data. In the present disclosure, the pre-learned network function may be learned to reduce and restore the dimension of the training data. The network function of the present disclosure may include an auto encoder capable of reducing and restoring the dimension of the input data. Further, the network function of the present disclosure may include a random network function which may operate to generate the input data as an output. For example, the network function of the present disclosure may include a network function configured by combining the auto encoder capable of restoring the input data, a generative adversarial network (GAN) generating a similar output to the input data, a U network, a convolutional network, and de-convolutional network. That is, since the network function of the present disclosure is learned to output an output data close to the input data and learned only by the normal data, when the input data is the normal data not including the anomaly, the output data may be similar to the input data. When the anomaly data is input into the network function of the present disclosure, the network function of the present disclosure does not perform the learning of restoration of an anomaly pattern, and as a result, there is a possibility that the output data will not be similar to the input data rather than the output when the normal data is received as an input. That is, the pre-learned network function of the present disclosure may detect a novelty for the anomaly pattern which is not learned in the input data and the novelty may be represented as a reconstruction error of the output data for the input data. When the reconstruction error exceeds a predetermined threshold, the processor 110 judges that the input data includes an unlearned pattern (i.e., anomal pattern) to detect that the input data includes the anomaly.

The processor 110 may compute the input data by using at least one of a plurality of generated anomaly detection sub models. The processor 110 may compute the input data by using the latest anomaly detection sub model among the plurality of generated anomaly detection sub models. The processor 110 may compute the input data by using the latest anomaly detection sub model among the plurality of anomaly detection sub models and compute the input data by using an anomaly detection sub model generated in the past gradually from the latest anomaly detection sub model. The input data may include an image data of a product acquired in the production process, operation parameters for operating apparatuses in the production process, and a sensor data acquired in the production process, but the present disclosure is not limited thereto. In respect to the input data of the present disclosure, in the production process, the processor 110 may perform a computation in which the production equipment transforms the input data to a data different from the input data and restores the data by using the anomaly detection sub model. The processor 110 may perform the computation to reduce the dimension of the input data, and restore the dimension and generate the output similar to the input data by using the anomaly detection sub model. The processor 110 may extract the feature from the input data by using the anomaly detection sub model, and restore the input data based on the extracted feature. As described above, since the network function included in the anomaly detection sub model of the present disclosure may include a network function capable of restoring the input data, the processor 110 may restore the input data by computing the input data by using the anomaly detection sub model. In another exemplary embodiment of the present disclosure, the anomaly detection sub model may include a plurality of network functions and in this case, the processor 110 may perform the computation by inputting the input data into the plurality of network functions.

The processor 110 may judge whether the anomaly is existed in the input data based on the output data for the input data of at least one of the plurality of anomaly detection sub models and the input data. As described above, in an exemplary embodiment of the present disclosure, the anomaly detection sub model may be learned to learn the pattern of the normal data by setting the normal data as the training data and output the output data similar to the input data. Accordingly, in an exemplary embodiment of the present disclosure, the processor 110 may compute the reconstruction error of the output data through comparing the output data and the input data of the anomaly detection sub model. The processor 110 may detect that the input data includes a new pattern which is not learned by the pre-learned anomaly detection sub model based on the reconstruction error. When a degree of the novelty (i.e., a size of the reconstruction error) is equal to or more than a predetermined threshold, the processor 110 may judge that the input data includes the new pattern which is not learned. Since the anomaly detection sub model is learned by setting the normal data as the training data, the new pattern not learned may be the anomaly. When the input data includes the new pattern which is not learned, the processor 110 may judge that the input data is the anomaly data including the anomaly. In another exemplary embodiment of the present disclosure, the anomaly detection sub model may include a plurality of network functions and the processor 110 computes the reconstruction error of the output data by comparing the output data and the input data of the plurality of network functions to judge whether the new pattern is existed in the input data. In this case, the processor 110 ensembles the plurality of network functions included in each anomaly detection sub model to judge whether the new pattern is existed in the input data. For example, the processor 10 compares the output data and the input data of the plurality of network functions included in each anomaly detection sub model and computes the reconstruction error to derive a plurality of reconstruction errors and combines the plurality of reconstruction errors to judge whether the new pattern is existed in the input data.

When the processor 110 judges that the input data includes the new pattern by using the anomaly detection sub model, the processor 110 may judge whether the input data includes the new pattern by using the anomaly detection sub model generated earlier than the anomaly detection sub model. The processor 110 may judge whether the new pattern is existed in the input data by using the second anomaly detection sub model. The processor 110 may judge whether a new pattern (e.g., anomaly or another normal pattern) which is not learned in the second anomaly detection sub model is existed in the input data based on the reconstruction errors of the output data and the input data by using the second anomaly detection sub model. When the processor 110 judges that the new pattern is existed in the input data by using the second anomaly detection sub model, the processor 110 may additionally judge whether the anomaly is existed in the input data by using the first anomaly detection sub model. When the processor 110 judges that the input data includes the new pattern by using the latest anomaly detection sub model, the processor 110 may judge whether the input data includes the new pattern by using the previous anomaly detection sub model. For example, when there is the change of the recipe in the semiconductor process, it may be judged that the new pattern is existed in the input data in judgment using the anomaly detection sub model learned with the latest training data, but it may be judged that the new pattern is not existed in the corresponding input data in judgment using a past anomaly detection sub model. It may be judged that the input data is the anomaly in the latest anomaly detection sub model, but for example, when there is the change of the recipe in the process, if the input data is a sensor data acquired in the process produced by the previous recipe, the corresponding input data may be normal in the previous recipe. In this case, the processor 110 may judge that the corresponding input data is the normal data. When the processor 110 judges that the anomaly is existed in the input data in all of the plurality of anomaly detection sub models included in the anomaly detection model, the processor 110 may judge that the anomaly is existed in the input data. Accordingly, in an exemplary embodiment of the present disclosure, the processor 110 detects the anomaly of the input data by using the plurality of anomaly detection sub models learned by using the plurality of training data subsets to judge whether the anomaly is existed in the input data corresponding to various recipes. For example, in the case of a manufacturing process in which there is the change in process every six months, the plurality of anomaly detection sub models of an exemplary embodiment of the present disclosure may be sub models learned with the training data corresponding to each change of the manufacturing process. In this case, the anomaly detection model may judge whether the anomaly is existed in the input data by using the anomaly detection sub model corresponding to each manufacturing process. Even when it is judged that the anomaly is existed in the input data by the anomaly detection sub model generated with the latest training data, if it is judged that the anomaly is not existed in the past anomaly detection sub model, it the corresponding input data may be judged as a normal sensor data generated by not the latest process but the previous process. When the processor 110 judges that the anomaly is existed in the input data in all of the plurality of anomaly detection sub models included in the anomaly detection model, the processor 110 may judge that the anomaly is existed in the input data. In an exemplary embodiment of the present disclosure, it may be judged whether a produced product is a normal product in a current process or a previous process through the anomaly judgment method. Accordingly, anomaly judgment performance may be maintained in response to the change of the process.

In the anomaly judgment method according to an exemplary embodiment of the present disclosure, it is judged whether the anomaly is existed in the data by using the anomaly detection model including each learned anomaly detection sub model by using the plurality of training data subsets to minimize oblivion of information learned in a previous model and judge whether the anomaly is existed in the input data generated to correspond to various processes in response to the change of the process in an industrial field. The model is configured by training the sub model through the training data grouped according to a predetermined criterion and storing the trained sub model to reduce a consumption amount of a computer resource (e.g., a problem of a storage space, a problem of a computation amount, a problem of a learning difficulty such as overfitting, etc.) rather than a case of training the model through all accumulated training data in order to prevent the previously learned knowledge from being forgotten.

According to an exemplary embodiment of the present disclosure, the processor 110 may generate the anomaly detection model including the plurality of anomaly detection sub models including the pre-learned network function by using the plurality of training data subsets included in the training data set. In detail, the training data set may include a plurality of training data subsets. The plurality of training data subsets may include different training data grouped by a predetermined criterion. The predetermined criterion for grouping the plurality of training data subsets may include at least one of a generation time interval of the training data and a domain of the training data. For example, the training data set may be constituted by a plurality of training data regarding a sensor data acquired in a semiconductor production process, an operation parameter of a production equipment, etc. In this case, when a setting (e.g., a change of a wavelength of a laser irradiated in a specific process, etc.) of the production equipment is changed in the semiconductor production process (i.e., when there is a change in recipe), the sensor data acquired after the setting change may be included in a different training data subset from the sensor data acquired before the setting change. The concrete description of the predetermined criterion for grouping the training data subset is just an example and the present disclosure is not limited thereto.

That is, the processor 110 may form a plurality of training data subsets by grouping a plurality of training data included in the training data set according to a predetermined criterion and train each anomaly detection sub model including one or more network functions by using the plurality of training data subsets to generate the anomaly detection model including the plurality of anomaly detection sub models. In an exemplary embodiment of the present disclosure, the training may be a semi supervised learning.

For example, as the recipe is changed every six months in the semiconductor process, the processor 110 may group training data generated during a first time interval into a first training data subset and group training data corresponding to sensor data acquired during a second time interval into a second training data subset. The processor 110 may generate an anomaly detection model including a first anomaly detection sub model and a second anomaly detection sub model by training the first anomaly detection sub model including the first network function through the first training data subset grouped into the training data generated during the first time interval and training the second anomaly detection sub model including the second network function through the second training data subset grouped into the training data generated during the second time interval. In this case, since the anomaly detection model includes the first anomaly detection sub model and the second anomaly detection sub model, the anomaly detection model may detect whether all data corresponding to the first time interval and the second time interval are anomal. The concrete description of the time interval and the grouping of the training data subset is just an example and the present disclosure is not limited thereto.

Accordingly, the anomaly detection model generated by the processor 110 includes the anomaly detection sub model learned by using each training data subset to detect anomalies of various types of data.

According to an exemplary embodiment of the present disclosure, the processor 110 may determine one or more anomaly detection sub models for computing the input data among the plurality of generated anomaly detection sub models. Specifically, the processor 110 may determine one or more anomaly detection sub models for computing the input data based on at least one of a processing tendency of different input data for the plurality of anomaly detection sub models, context information of the input data, or cluster information of the input data.

The processing tendency of different input data for the plurality of anomaly detection sub models may include information related to by which anomaly detection sub model other data input data associated with the input data is judged to be normal. The processor 110 may determine an anomaly detection sub model for computing other input data having a predetermined relationship with the input data as the anomaly detection sub model for computing the input data. Other input data may include an input data generated before generating the input data and include the input data and data generated within a predetermined time interval. The processor 110 may determine an anomaly detection sub model for judging other data input data having the predetermined relationship with the input data as the normal data as the anomaly detection sub model for computing the input data.

For example, the input data may be a data generated at a predetermined time interval. When input data within a predetermined number before the input data are determined as the normal data by a specific anomaly detection sub model, there is a high probability that the input data will be similar to the previous data. Accordingly, since there is a high probability that the input data will be determined as the normal data by the anomaly detection sub model in which the previous data is processed, the processor 110 may select the anomaly detection sub model that judges that the previous data is normal so as to judge the input data. The detailed description of the input data described above is just an example and the present disclosure is not limited thereto.

That is, the processor 110 may determine an optimal anomaly detection sub model for processing the input data among the plurality of anomaly detection sub models based on the processing tendency of other input data.

Further, the processor 110 may determine an anomaly detection sub model matched to context information as one or more anomaly detection sub models for computing the input data based on the context information of the input data. The context information may include an information for associating the input data with a normal pattern, and may include at least one of a context indicator for associating the input data with at least one of a manufacturing recipe or a manufacturing equipment, a context characteristic indicator for associating with at least one of a manufacturing recipe characteristic or a manufacturing equipment characteristic of the input data, or a missing characteristic indicator including information for a missing characteristic of the input data.

The context information may be matched to at least one of the input data or a training data, and the anomaly detection sub model may be matched to the context information matching to the training data subsets. Description of the context information is discussed specifically in Korea Patent Application 10-2019-0050477 (filed on Apr. 30, 2019) that is integrated herein as a reference in its entirety.

For example, when a first context information of a first input data includes a first context characteristics indicator indicating a normal operation parameter range in a specific manufacturing equipment, the processor 110 may identify a first anomaly detection sub model matched to the first context information based on the first context characteristic indicator included in the first context information of the first input data. Further, the processor 110 may determine the identified first anomaly detection sub model as an anomaly detection sub model for processing the first input data. The concrete description of the information included in the context information is just an example and the present disclosure is not limited thereto.

That is, the processor 110 may determine an optimal anomaly detection sub model for processing the input data among the plurality of anomaly detection sub models based on the context information of the input data.

Further, the processor 110 may determine one or more anomaly detection sub models for calculating the input data based on cluster information of the input data. Specifically, the processor 110 may determine an anomaly detection sub model for calculating other input data included in a cluster to which the input data belongs as the anomaly detection sub model for calculating the input data.

Specifically, the processor 110 may cluster one or more input data based on a similarity. For example, when a first input data includes information on an angle sensor data of a first joint of a robot arm and a second input data includes information on the angle sensor data of the first joint of the robot arm, the processor 110 judges that the similarity between respective input data is high to make the first input data and the second input data be included in the same cluster. As another example, when a third input data includes information on the angle sensor data of a joint of a robot arm and a fourth input data includes information on a temperature sensor data, the processor 110 judges that the similarity between respective input data is low to make the third input data and the fourth input data be included in different clusters. The detailed description of the information included in each input data and the clustering of each input data is just an example and the present disclosure is not limited thereto.

That is, each of one or more input data according to an exemplary embodiment of the present disclosure may be clustered by the processor 110.

The processor 110 may determine an anomaly detection sub model for processing the corresponding input data based on cluster information of the input data. As a specific example, when the first input data and the second input data are pre-classified into a first cluster by the processor 110 and processing the first input data at a previous time is performed through the first anomaly detection sub model, the processor 110 may determine the first anomaly detection sub model for calculating the first input data which is other input data in the same cluster as an anomaly detection sub model for calculating the second input data. The detailed description of each input data and the cluster described above is just an example and the present disclosure is not limited thereto.

That is, the processor 110 may determine an optimal anomaly detection sub model for processing the input data among the plurality of anomaly detection sub models based on the cluster information of the input data.

As described above, the processor 110 may determine one or more anomaly detection sub models for calculating the input data based on at least one of a processing tendency of the input data, context information of the input data, or cluster information of the input data.

In other words, the processor 110 may minimize unnecessary inference by predicting an anomaly detection sub model suitable for processing for each of various input data. As a result, the processing performance of the anomaly detection sub model may be enhanced.

According to an exemplary embodiment of the present disclosure, the processor 110 may generate an integrated anomaly detection sub model through integrating one or more anomaly detection sub models. Specifically, the processor 110 clusters the plurality of anomaly detection sub models and integrates one or more anomaly detection sub models included in one cluster as a result of clustering to generate the integrated anomaly detection sub model.

Specifically, the processor 110 may cluster one or more anomaly detection sub models included in the plurality of anomaly detection sub models based on at least one of context information matched to each anomaly detection sub model or an input data processing characteristic of each anomaly detection sub model.

The processor 110 may identify the context information matched to each anomaly detection sub model and cluster the anomaly detection sub model based on a comparison of each identified context information. For example, when a first context information is matched to the first anomaly detection sub model and the first context information is matched to the second anomaly detection sub model, the processor 110 identifies that the same first context information is matched to each anomaly detection sub model to make the first and second anomaly detection sub models be included in the same cluster. As another example, when the first context information is matched to the second anomaly detection sub model and a second context information is matched to the third anomaly detection sub model, the processor 110 identifies that different context information is matched to each anomaly detection sub model to make the second and third anomaly detection sub models be included in different clusters. The detailed description of the context information matched to each anomaly detection sub model is just an example and the present disclosure is not limited thereto.

Further, the processor 110 may cluster the anomaly detection sub model based on the input data processing characteristic of each anomaly detection sub model. Specifically, the processor 110 may cluster anomaly detection sub models having a similar processing tendency for the input data to the same cluster.

Further, the processor 110 may cluster the anomaly detection sub model based on a judgment result for the input of each anomaly detection sub model. Specifically, when the input data and other input data are associated with each other, the processor 110 may cluster an anomaly detection sub model judging the input data as the normal data and an anomaly detection sub model judging other input data as the normal data to one cluster.

More specifically, the processor 110 may classify one or more anomaly detection sub models judging the input data as the normal data to one cluster. The processor 110 may determine in which anomaly detection sub model the input data is judged to be normal for detection of the anomaly of the input data. For example, the processor 110 may process the input data through each anomaly detection sub model and identify a plurality of anomaly detection sub models judging the input data as the normal data. The plurality of anomaly detection sub models may be clustered to the same cluster. Further, the processor 110 may identify a plurality of anomaly detection sub models judging each input data as the normal data with respect to a plurality of input data. The processor 110 may generate a plurality of anomaly detection sub models in which the judgment result for the input data is similar as the integrated anomaly detection sub model.

Further, the processor 110 may generate the integrated anomaly detection sub model through integrating one or more anomaly detection sub models included in one cluster. Further, the processor 110 may generate the integrated anomaly detection sub model through an ensemble of one or more anomaly detection sub models included in one cluster. The ensemble between the models may be setting a learning weight of the integrated anomaly detection sub model based on an average value of weights of respective network functions constituting each of one or more anomaly detection sub models. The aforementioned description is just an example and the present disclosure is not limited thereto.

The processor 110 may generate the integrated anomaly detection sub model through integrating connection weights of one or more anomaly detection sub models included in one cluster. For example, the processor 110 may generate the integrated anomaly detection sub model through integrating the weights of the plurality of anomaly detection sub models to be maintained without forgetting the knowledge of other neural network.

Further, the processor 110 may generate the integrated anomaly detection sub model through removing at least some among one or more anomaly detection sub models included in one cluster. Specifically, the processor 110 may generate the integrated anomaly detection sub model through removing an anomaly detection sub model in which a recent processing tendency (i.e., a probability selected for processing a recent input data) of the processing of the input data is comparatively low based on an input data processing time of each of one or more anomaly detection sub models included in one cluster. That is, the processing tendency of the recent input data may be reflected to the integrated anomaly detection sub model generated through removing some among one or more anomaly detection sub models included in one cluster.

Further, the processor 110 may generate the integrated anomaly detection sub model based on a performance test for one or more anomaly detection sub models included in one cluster. Specifically, the processor 110 performs the performance test of each of one or more anomaly detection sub models included in one cluster through a test data set and selects only anomaly detection sub models which exceed a predetermined output accuracy as a result of the performance test to generate the integrated anomaly detection sub model.

Further, the processor 110 may generate the integrated anomaly detection sub model through re-training one or more anomaly detection sub models included in one cluster. Specifically, the processor 110 generates an integrated network function through an ensemble of the network functions of each of one or more anomaly detection sub models included in one cluster and performs re-training for the integrated network function through an additional training data set to generate the integrated anomaly detection sub model.

That is, the processor 110 generates the integrated anomaly detection sub model through integrating one or more anomaly detection sub models included in one cluster to reduce the computation amount of the model and increase the performance of the model.

Figure 2:
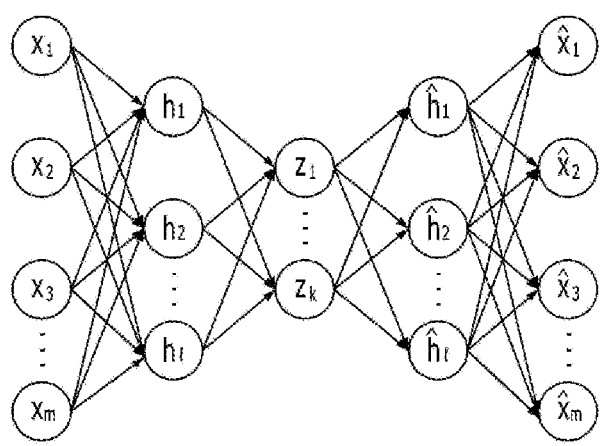
FIG. 2 is a schematic view illustrating a network function according to an exemplary embodiment of the present disclosure.

FIG. 2 is a schematic view illustrating a network function 200 according to an exemplary embodiment of the present disclosure.

Throughout the present specification, a computation model, the neural network, a network function, and the neural network may be used as the same meaning. The neural network may be generally constituted by an aggregate of calculation units which are mutually connected to each other, which may be called "node". The "nodes" may also be called "neurons". The neural network is configured to include one or more nodes. The nodes (alternatively, neurons) constituting the neural networks may be connected to each other by one or more "links".

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of the output node may be determined based on data input in the input node. Here, a node connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form the input node and output node relationship in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be configured to include one or more nodes. Some of the nodes constituting the neural network may constitute one layer based on the distances from the initial input node. For example, a set of nodes of which distance from the initial input node is n may constitute n layers. The distance from the initial input node may be defined by the minimum number of links through which should pass for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network. In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to still another exemplary embodiment of the present disclosure, the number of nodes of the input layer may be larger than the number of nodes of the output layer, and the neural network may be a neural network of a type in which the number of nodes increases from the input layer to the hidden layer. The neural network according to yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, potential structures of photos, text, video, voice, and music (e.g., what objects are in the picture, what the content and feelings of the text are, what the content and feelings of the voice are) may be determined. The deep neural network may include a convolutional neural network, a recurrent neural network (RNN), an auto encoder, generative adversarial networks (GAN), a restricted Boltzmann machine (RBM), a deep belief network (DBN), a Q network, a U network, a Siam network, and the like. The description of the deep neural network described above is just an example and the present disclosure is not limited thereto.

In an exemplary embodiment of the present disclosure, the network function 200 may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. In this case, in the example of FIG. 2, it is illustrated that the dimension reduction layer and the dimension reconstruction layer are symmetric, but the present disclosure is not limited thereto and the nodes of the dimension reduction layer and the dimension reconstruction layer may be symmetric or not. The auto encoder may perform non-linear dimensional reduction. The number of input and output layers may correspond to the number of sensors remaining after pre-processing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, and semi supervised learning. Learning of the neural network is to minimize errors in output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network) of actual data, and as a result, there may be a learning cycle in which errors for the learning data decrease, but the errors for the actual data increase. Overfitting is a phenomenon in which the errors for the actual data increase due to excessive learning of the learning data. For example, a phenomenon in which a neural network that learns a cat views cats other than a yellow cat and does not recognize that the cats other than the yellow cat are the cat by showing the yellow cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, etc., may be applied.

Disclosed is a computer readable medium storing the data structure according to an exemplary embodiment of the present disclosure.

The data structure may refer to the organization, management, and storage of data that enables efficient access to and modification of data. The data structure may refer to the organization of data for solving a specific problem (e.g., data search, data storage, data modification in the shortest time). The data structures may be defined as physical or logical relationships between data elements, designed to support specific data processing functions. The logical relationship between data elements may include a connection relationship between data elements that the user thinks. The physical relationship between data elements may include an actual relationship between data elements physically stored on a computer-readable storage medium (e.g., hard disk). The data structure may specifically include a set of data, relationships between data, and functions or commands applicable to the data. Through an effectively designed data structure, a computing device can perform operations while using the resources of the computing device to a minimum. Specifically, the computing device can increase the efficiency of operation, read, insert, delete, compare, exchange, and search through the effectively designed data structure. The data structure may be divided into a linear data structure and a non-linear data structure according to the type of data structure. The linear data structure may be a structure in which only one data is connected after one data. The linear data structure may include a list, a stack, a queue, and a deck. The list may mean a series of data sets in which an order exists internally. The list may include a linked list. The linked list may be a data structure in which data is connected in a manner that each data is connected in a row with a pointer. In the connection list, the pointer may include connection information with next or previous data. The linked list may be represented as a single linked list, a double linked list, or a circular linked list depending on the type. The stack may be a data listing structure with limited access to data. The stack may be a linear data structure that may process (e.g., insert or delete) data at only one end of the data structure. The data stored in the stack may be a data structure (LIFO-Last in First Out) in which the data is input last and output first. The queue is a data arrangement structure that may access data limitedly and unlike a stack, the queue may be a data structure (FIFO-First in First Out) in which late stored data is output late. The deck may be a data structure capable of processing data at both ends of the data structure.

The nonlinear data structure may be a structure in which a plurality of data are connected after one data. The non-linear data structure may include a graph data structure. The graph data structure may be defined as a vertex and an edge, and the edge may include a line connecting two different vertices. The graph data structure may include a tree data structure. The tree data structure may be a data structure in which there is one path connecting two different vertices among a plurality of vertices included in the tree. That is, the tree data structure may be a data structure that does not form a loop in the graph data structure.

Throughout the present specification, a computation model, the neural network, a network function, and the neural network may be used as the same meaning (Hereinafter, the computation model, the neural network, the network function, and the neural network will be integrated and described). The data structure may include the neural network. In addition, the data structures, including the neural network, may be stored in a computer readable medium. The data structure including the neural network may also include data input to the neural network, weights of the neural network, hyper parameters of the neural network, data obtained from the neural network, an active function associated with each node or layer of the neural network, and a loss function for training the neural network. The data structure including the neural network may include predetermined components of the components disclosed above. In other words, the data structure including the neural network may include all of data input to the neural network, weights of the neural network, hyper parameters of the neural network, data obtained from the neural network, an active function associated with each node or layer of the neural network, and a loss function for training the neural network or a combination thereof. In addition to the above-described configurations, the data structure including the neural network may include predetermined other information that determines the characteristics of the neural network. In addition, the data structure may include all types of data used or generated in the calculation process of the neural network, and is not limited to the above. The computer readable medium may include a computer readable recording medium and/or a computer readable transmission medium. The neural network may be generally constituted by an aggregate of calculation units which are mutually connected to each other, which may be called node. The nodes may also be called neurons. The neural network is configured to include one or more nodes.

The data structure may include data input into the neural network. The data structure including the data input into the neural network may be stored in the computer readable medium. The data input to the neural network may include training data input in a neural network training process and/or input data input to a neural network in which training is completed. The data input to the neural network may include preprocessed data and/or data to be preprocessed. The preprocessing may include a data processing process for inputting data into the neural network. Therefore, the data structure may include data to be preprocessed and data generated by preprocessing. The data structure is just an example and the present disclosure is not limited thereto.

The data structure may include weights of the neural network (weights and parameters may be used as the same meaning in the present disclosure). In addition, the data structures, including the weight of the neural network, may be stored in the computer readable medium. The neural network may include a plurality of weights. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the parameters set in the links corresponding to the respective input nodes. The data structure is just an example and the present disclosure is not limited thereto. As a non-limiting example, the weight may include a weight which varies in the neural network training process and/or a weight in which neural network training is completed. The weight which varies in the neural network training process may include a weight at a time when a training cycle starts and/or a weight that varies during the training cycle. The weight in which the neural network training is completed may include a weight in which the training cycle is completed. Accordingly, the data structure including the weight of the neural network may include a data structure including the weight which varies in the neural network training process and/or the weight in which neural network training is completed. Therefore, it is assumed that the above-described weights and/or combinations of respective weights are included in the data structure including the weights of the neural network. The data structure is just an example and the present disclosure is not limited thereto.

The data structure including the weight of the neural network may be stored in the computer-readable storage medium (e.g., memory, hard disk) after a serialization process. Serialization may be a process of storing data structures on the same or different computing devices and later reconfiguring the data structure and converting the data structure to a form that may be used. The computing device may serialize the data structure to send and receive data over the network. The data structure including the weight of the serialized neural network may be reconstructed in the same computing device or another computing device through deserialization. The data structure including the weight of the neural network is not limited to the serialization. Furthermore, the data structure including the weight of the neural network may include a data structure (for example, B-Tree, Trie, m-way search tree, AVL tree, and Red-Black Tree in a nonlinear data structure) to increase the efficiency of operation while using resources of the computing device to a minimum. The above-described matter is just an example and the present disclosure is not limited thereto.

The data structure may include hyper-parameters of the neural network. In addition, the data structures, including the hyper-parameters of the neural network, may be stored in the computer readable medium. The hyper-parameter may be a variable which may be varied by the user. The hyper-parameter may include, for example, a learning rate, a cost function, the number of learning cycle iterations, weight initialization (for example, setting a range of weight values to be subjected to weight initialization), and Hidden Unit number (e.g., the number of hidden layers and the number of nodes in the hidden layer). The data structure is just an example and the present disclosure is not limited thereto.

Figure 3:
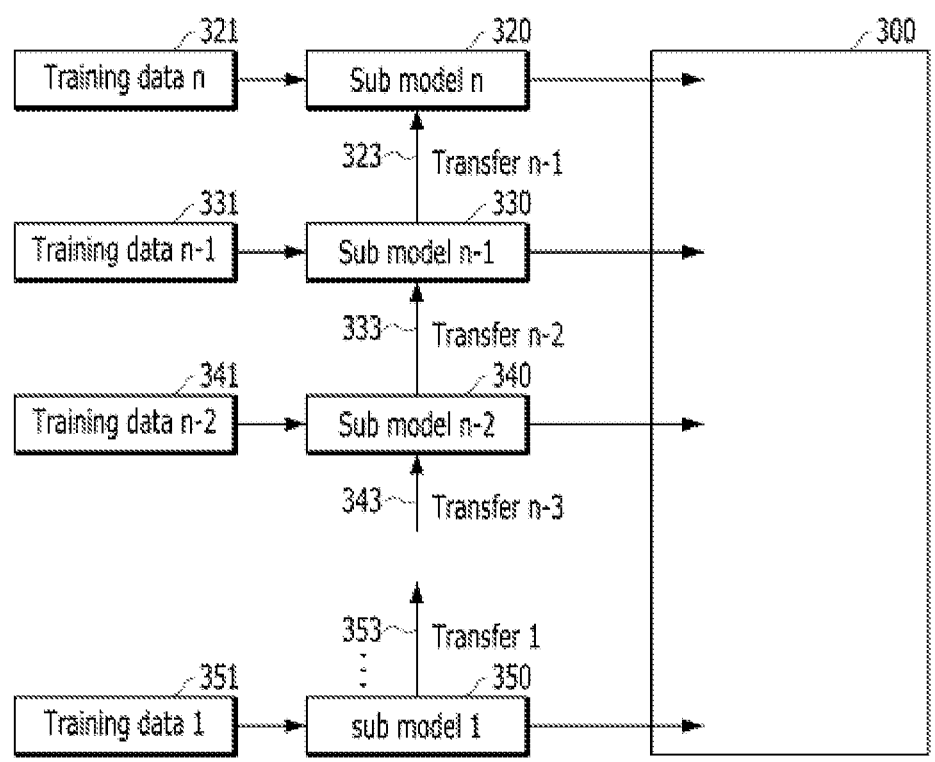
FIG. 3 is a schematic view illustrating a process of generating an anomaly detection model according to an exemplary embodiment of the present disclosure.

FIG. 3 is a schematic view illustrating a process of generating an anomaly detection model according to an exemplary embodiment of the present disclosure.

Training data 321, 331, 341, and 351 may include a plurality of subsets. The plurality of training data subsets may be grouped by a predetermined criterion. The predetermined criterion may include a random criterion to distinguish a training data included in the training data subset from training data included in other training data subsets. For example, the predetermined criterion may include at least one of a generation time interval of the training data and a domain of the training data. In another exemplary embodiment of the present disclosure, when the training data are grouped by a generation time interval of the training data, a plurality of normal patterns may be included in one training data subset. For example, when training data generated for 6 months is constituted by one subset, training data (i.e., a plurality of normal patterns) generated by two or more recipes may be included in one subset. In this case, one anomaly detection sub model may include the plurality of normal patterns and may be used for anomaly detection (e.g., novelty detection) for the plurality of normal patterns. Further, in still another exemplary embodiment of the present disclosure, training data and input data generated by one recipe may have the plurality of normal patterns. In this case, the training data generated by one recipe may be constituted by one training data subset including the plurality of normal patterns based on one recipe and the training data subset may be constituted for each normal pattern. The training data and the input data generated by one recipe may have one normal pattern or the plurality of normal patterns. Further, for example, the training data subsets may be grouped based on whether the new pattern is included by a pre-learned anomaly detection sub model. For example, the generation time interval of the training data may be a time interval having a constant size or a time interval having different sizes. For example, when the change of the recipe in the production process occurs in a cycle of 6 months, the generation time interval of the training data to distinguish the training data subset may be 6 months. Further, for example, the size of the time interval may be set so that the numbers of training data included in the training data subsets are similar to each other. For example, the number of training data acquired when an operation rate of the production process is 50% may be half of the number of training data acquired when the operation rate of the production process is 100%. In this case, when one training data subset is constituted by collecting the training data for 3 months in the process in which the operation rate of the production process is 100%, one training data subset may be configured by collecting the training data for 6 months in the process in which the operation rate of the production process is 50%. The generation time interval for distinguishing the training data subset may be set by an administrator. Further, in another exemplary embodiment of the present disclosure, in which a training data used for learning the previous anomaly detection sub model is reused for learning the anomaly detection sub model, in order to train the anomaly detection sub model more fitted to the latest training data, the size of the time interval for distinguishing the training data subset may be increased for the more latest training data subset (i.e., the large number of recent training data is included in the training data set for training). For example, when the training data subset for training the previous sub model is sensor data accumulated for 3 months, a training data subset for training a current sub model may be sensor data accumulated for 6 months. The size of the generation time interval for classifying the training data subset may be constant or different and in spite of a case where the size of the time interval is set differently, when the recipe of the process is changed, training data accumulated before and after the recipe change may be included in different training data subsets.

In the example of FIG. 3, training data subset 1 351 may be a training data generated the longest ago. Training data subset n 321 may be a training data generated most recently. In an exemplary embodiment, the training data subset may be grouped in response to the recipe change of the process.

The computing device 100 may train anomaly detection sub model 1 350 by using training data subset 1 351. Anomaly detection sub model 1 350 of which training is completed may be included in the anomaly detection model 300. The computing device 100 may train a next anomaly detection sub model by using a next training data subset and in this case, at least some of the learned previous anomaly detection sub models may be transferred to the next anomaly detection sub model. As described above, for example, the next anomaly detection sub model may share some weights of the previous anomaly detection sub model which is learned. Through such a scheme, the anomaly detection model 300 of an exemplary embodiment of the present disclosure may be continually learned.

The computing device 100 may train anomaly detection sub model n-2 340 by using training data subset n-2 341. In this case, in the computing device 100, some of anomaly detection sub model n-3 (not illustrated, a previous anomaly detection sub model of the anomaly detection sub model n-2 340) may be transferred (343). Anomaly detection sub model n-2 340 of which learning is completed may be included in the anomaly detection model 300. The computer device 100 may distinguish the learning-completed anomaly detection sub model n-2 340 from other anomaly detection sub model and store the corresponding anomaly detection sub model.

The computing device 100 may train anomaly detection sub model n-1 330 by using training data subset n-1 331. The training data subset n-2 331 may include a training data generated during a time interval after a time interval in which the training data subset n-2 341 is generated. The anomaly detection sub model n-1 330 may be a sub model generated after the anomaly detection sub model n-2 340. The computing device 100 may use some of learned states of the anomaly detection sub model n-2 340 for learning the anomaly detection sub model n-1 330. The computing device 100 may set at least some of initial weights of the anomaly detection sub model n-1 330 as the weight of the learned anomaly detection sub model n-2 340. The learning-completed anomaly detection sub model n-1 330 may be included in the anomaly detection model 300. The computing device 100 may distinguish the learning-completed anomaly detection sub model n-1 330 from other anomaly detection sub model and store the corresponding anomaly detection sub model.

The computing device 100 may train anomaly detection sub model n 320 by using training data subset n 321. The training data subset n 321 may include a training data generated during a time interval after a time interval in which the training data subset n-1 331 is generated. The anomaly detection sub model n 320 may be a sub model generated after the anomaly detection sub model n-1 330. The computing device 100 may use some of learned states of the anomaly detection sub model n-1 330 for learning the anomaly detection sub model n 320. The computing device 100 may set at least some of initial weights of the anomaly detection sub model n 320 as the weight of the learned anomaly detection sub model n-1 330. The learning-completed anomaly detection sub model n 320 may be included in the anomaly detection model 300. The computing device 100 may distinguish the learning-completed anomaly detection sub model n 320 from other anomaly detection sub model and store the corresponding anomaly detection sub model.

The computing device 100 generates the anomaly detection model 300 by training respective anomaly detection sub models by using a plurality of training data subsets, respectively to allow the anomaly detection model 300 to process different types of input data. Further, the computing device 100 uses the previous learning-completed anomaly detection sub model when training each anomaly detection sub model to prevent the knowledge of the learning-completed sub model from being forgotten by an update of the sub model. When the process is changed, an acquired input data acquired may be changed in response thereto. However, the input data before and after the process change may share a lot of parts. Accordingly, each anomaly detection sub model is generated according to the change of the input data such as the process change, etc., to process the input data irrespective of the change of the input data and the knowledge learned between the anomaly detection sub models is transferred to a next sub model to solve a problem of performance drop due to oblivion.

Figure 4:
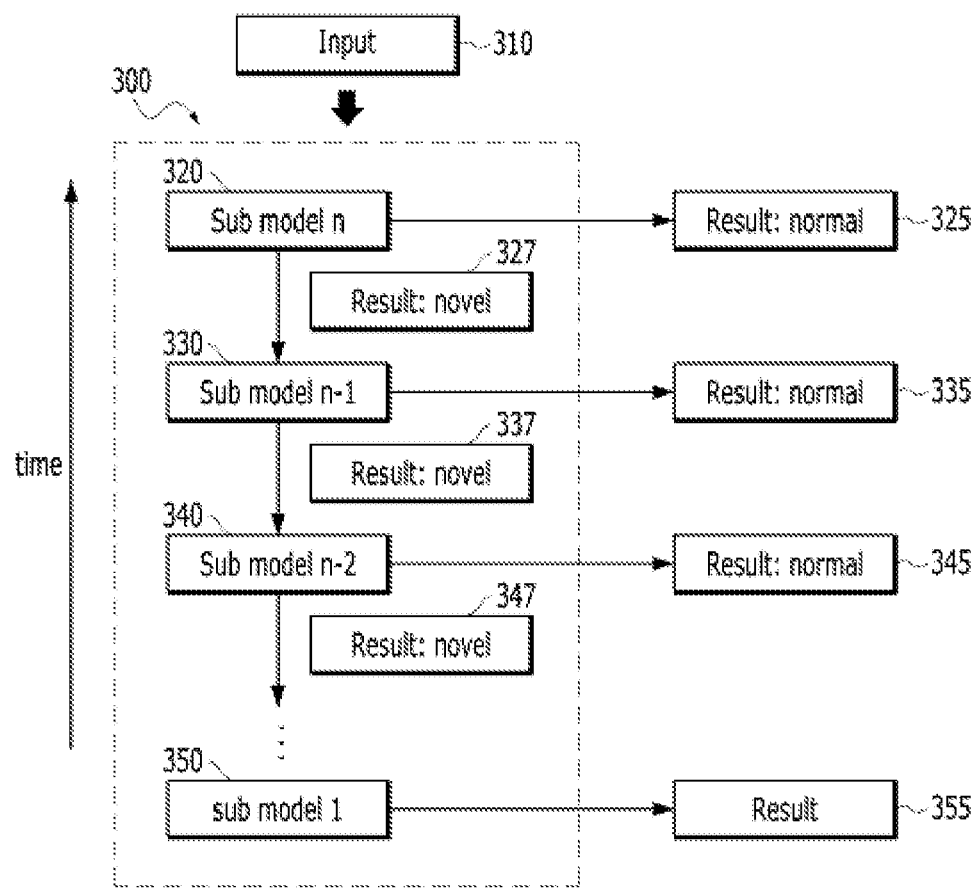
FIG. 4 is a schematic view illustrating a process of detecting an anomaly of a data using an anomaly detection model according to an exemplary embodiment of the present disclosure.

FIG. 4 is a schematic view illustrating a process of detecting an anomaly of a data using an anomaly detection model according to an exemplary embodiment of the present disclosure.

The computing device 100 may judge whether the anomaly is existed in an input data 310 by using the anomaly detection model 300. The anomaly detection model 300 may include a plurality of anomaly detection sub models 320, 330, 340, and 350. As described above, the anomaly detection sub models 320, 330, 340, and 350 may be learned to correspond to grouped training data, respectively and may share a knowledge learned in the previous sub model.

The computing device 100 may process the input data 310 which may be generated in the process during the process being continued. The computing device 100 may judge whether the anomaly is existed in the input data 310 by using at least some of the plurality of anomaly detection sub models 320, 330, 340, and 350 included in the anomaly detection model 300. The computing device 100 may first judge whether the anomaly is existed in the input data 310 by using the anomaly detection sub model n 320 which is a latest anomaly detection sub model. When the computing device 100 judges that a new pattern is not existed in the input data 310 as a judgment result using the anomaly detection sub model n 320, the computing device 100 may judge that the input data 310 is the normal data (325). When the computing device 100 judges that the new pattern is existed in the input data 310 as the judgment result using the anomaly detection sub model n 320 (327), the new pattern may be the anomaly and may be the normal pattern of a past process which is not learned by the anomaly detection sub model n 320. Further, the new pattern may be a part where there is a lack of delivery of knowledge learned by the previous anomaly detection sub model. Accordingly, in this case, when the computing device 100 judges that the new pattern is included in the input data as a result of judging whether the new pattern is included in the input data using the anomaly detection sub model n 320.

When the computing device 100 judges that a new pattern (i.e., a pattern not included in the training data subset n-1 331) is not included in the input data 310 as the result of judging whether the new pattern is included in the input data 310 using the anomaly detection sub model n-1 330, the computing device 100 may judge the input data 310 as the normal data (335). That is, it is judged that the input data 310 is included as the new pattern in the anomaly detection sub model n 320, but it may be judged that only a pre-learned pattern is included in the anomaly detection sub model n-1 330. In this case, the input data 310 may be an input data acquired in the production process by the previous recipe. That is, the input data 310 in this case may be an image for a normal product in the past process, a data regarding a normal operation parameter of the past process, and a sensor data of the past process and it is judged that the new pattern is included in a latest anomaly detection sub model, and as a result, the past process may be different from a latest process.

When the computing device 100 judges that the new pattern is included in the input data 310 as the result of judging whether the new pattern is included in the input data 310 using the anomaly detection sub model n-1 330 (337), the computing device 100 may judge whether the new pattern is include in the input data 310 using the anomaly detection sub model n-2 340.

When the computing device 100 judges that a new pattern (i.e., a pattern not included in the training data subset n-2 341) is not included in the input data 310 as the result of judging whether the new pattern is included in the input data 310 using the anomaly detection sub model n-2 340, the computing device 100 may judge the input data 310 as the normal data (345). That is, it is judged that the input data 310 is included as the new pattern in the anomaly detection sub model n 320 and the anomaly detection sub model n-1 330, but it may be judged that only the pre-learned pattern is included in the anomaly detection sub model n-2 340. In this case, the input data 310 may be an input data acquired in the production process by the past recipe. That is, the input data 310 in this case may be an image acquired in the past process and it is judged that the new pattern is included in the latest anomaly detection sub model, and as a result, the past process may be different from the latest process.

When the computing device 100 judges that the new pattern is included in the input data 310 as the result of judging whether the new pattern is included in the input data 310 using the anomaly detection sub model n-2 340 (347), the computing device 100 may judge whether the new pattern is include in the input data 310 using a previous anomaly detection sub model (not illustrated) of the anomaly detection sub model n-2 340. When the computing device 100 judges that the new pattern is included in the input data by such a scheme, the computing device 100 may judge whether the new pattern is included in the input data using the previous anomaly detection sub model and when the computing device 100 judges that the input data is normal, the computing device 100 may stop calling the previous anomaly detection sub model and judge that the input data is normal. In another exemplary embodiment of the present disclosure, even when the computing device 100 judges that the input data is normal, the computing device 100 may call the previous anomaly detection sub model, and the computing device 100 may integrate a plurality of anomaly detection sub models based on the case where it is judged that the input data is normal in the plurality of anomaly detection sub models. Further, when the computing device 100 judges that the input data is included as the new pattern in a judgment using all anomaly detection sub models, the computing device 100 may judge that the input data 310 includes the anomaly.

In an exemplary embodiment of the present disclosure, the computing device 100 may enjoy an effect of a continuous learning only by an access to the previous sub model without a need of maintaining all past training data by using the sub model accumulation and anomaly judgment scheme described above. That is, an old model is maintained in a model update without a need of re-learning through all previous training data in the model update and a new model which inherits a part of the old model is trained with a new training data to perform the model update depending on the change of the input data. Further, both models before and after the update are possessed in the model update to process the input data through all models without the need of maintaining all training data, and as a result, it is possible to solve the performance drop problem depending on the change of the input data.

Figure 5:
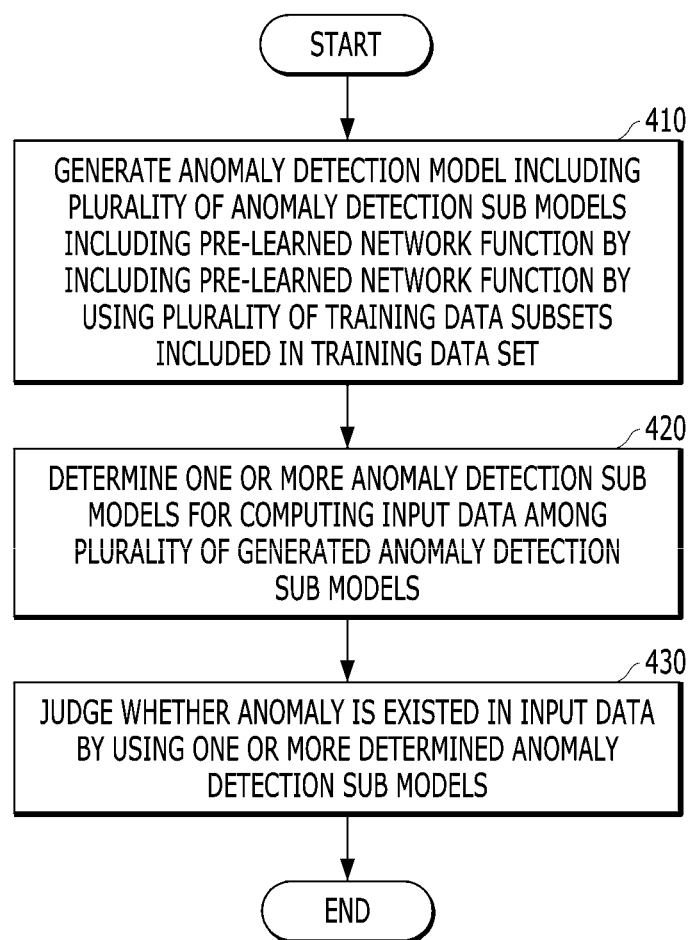
FIG. 5 is an exemplary flowchart of a method for detecting an anomaly of a data according to an exemplary embodiment of the present disclosure.

FIG. 5 is an exemplary flowchart of a method for detecting an anomaly of a data according to an exemplary embodiment of the present disclosure.

According to an exemplary embodiment of the present disclosure, the computing device 100 may generate the anomaly detection model including the plurality of anomaly detection sub models including the pre-learned network function by using the plurality of training data subsets included in the training data set (410).

According to an exemplary embodiment of the present disclosure, the computing device 100 may determine one or more anomaly detection sub models for computing the input data among the plurality of generated anomaly detection sub models (420).

According to an exemplary embodiment of the present disclosure, the computing device 100 may judge whether the anomaly is existed in the input data by using one or more determined anomaly detection sub models (430).

The steps of FIG. 5 described above may be changed in order as necessary, and at least one or more steps may be omitted or added. That is, the aforementioned steps are just an exemplary embodiment of the present disclosure and the scope of the present disclosure is not limited thereto.

Figure 6:
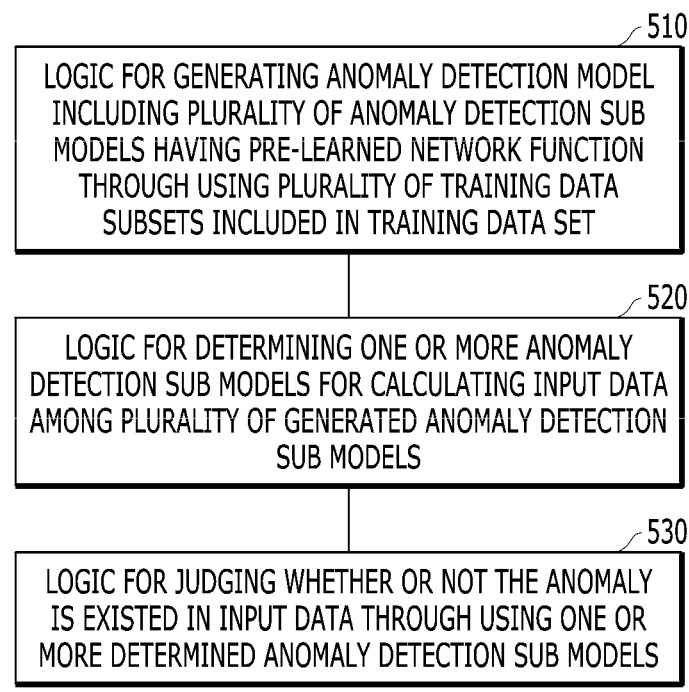
FIG. 6 illustrates a logic for implementing a method for detecting an anomaly of a data according to an exemplary embodiment of the present disclosure.

FIG. 6 illustrates a logic for implementing a method for detecting an anomaly of a data according to an exemplary embodiment of the present disclosure.

According to an exemplary embodiment of the present disclosure, the computing device 100 may be implemented by the following logics.

According to an exemplary embodiment of the present disclosure, the computing device 100 may include a logic 510 for generating an anomaly detection model including a plurality of anomaly detection sub models having a pre-learned network function through using a plurality of training data subsets included in a training data set, a logic 520 for determining one or more anomaly detection sub models for calculating an input data among the generated anomaly detection sub models, and a logic 530 for judging whether or not the anomaly is existed in the input data through using the one or more determined anomaly detection sub models.

In an alternative exemplary embodiment, the logic for determining one or more anomaly detection sub models for calculating an input data among the generated anomaly detection sub models may include a logic for determining one or more anomaly detection sub models for calculating the input data based on at least one of processing tendency of other input data for the plurality of anomaly detection sub models, context information of the input data, or cluster information of the input data.

In an alternative exemplary embodiment, the logic for determining one or more anomaly detection sub models for calculating an input data among the plurality of generated anomaly detection sub models may include a logic for determining the anomaly detection sub model for calculating other input data having a predetermined relationship with the input data as the anomaly detection sub model for calculating the input data. In an alternative exemplary embodiment, the other input data may include an input data generated before generating the input data and data generated within time interval predetermined with the input data.

In an alternative exemplary embodiment, the logic for determining the anomaly detection sub model for calculating the input data from the anomaly detection sub model which calculates other input data having predetermined relationships with the input data may include a logic for determining the anomaly detection sub model for calculating the input data from the anomaly detection sub model in which other input data having predetermined relationships with the input data is judged a normal data.

In an alternative exemplary embodiment, the logic for determining one or more anomaly detection sub models for calculating an input data among the generated anomaly detection sub models may include a logic for determining one or more anomaly detection sub model for calculating the input data from the anomaly detection sub model matching to the context information based on the context information of the input data.

In an alternative exemplary embodiment, the context information may include an information for associating the input data with a normal pattern, and at least one of a context indicator for associating the input data with at least one of a manufacturing recipe or a manufacturing equipment, a context characteristic indicator for associating the input data with at least one of a manufacturing recipe characteristic or a manufacturing equipment characteristic of the input data, or a missing characteristic indicator including information for a missing characteristic of the input data.

In an alternative exemplary embodiment, the context information may be matched to at least one of the input data or a training data, and the anomaly detection sub model may be matched to the context information matching to the training data subsets.

In an alternative exemplary embodiment, the logic for determining one or more anomaly detection sub models for calculating an input data among the plurality of generated anomaly detection sub models may include a logic for clustering one or more other input data based on a similarity, and a logic for determining the anomaly detection sub model for calculating the input data from the anomaly detection sub model calculating other input data included in a cluster having the input data.

In an alternative exemplary embodiment, the logic may further include a logic for clustering a plurality of anomaly detection sub models, and a logic for generating an integrated anomaly detection sub model through integrating one or more anomaly detection sub models included in one cluster.

In an alternative exemplary embodiment, the logic for clustering a plurality of anomaly detection sub models may include a logic for clustering one or more anomaly detection sub models included in the plurality of anomaly detection sub models based on at least one of a context information matched to each anomaly detection sub model, or an input data processing characteristic of each anomaly detection sub model.

In an alternative exemplary embodiment, the logic for clustering a plurality of anomaly detection sub models may include a logic for clustering the anomaly detection sub model based on a judging result for the input data of each anomaly detection sub model.

In an alternative exemplary embodiment, the logic for clustering the anomaly detection sub model based on a judging result for the input data of each anomaly detection sub model may include a logic for clustering the anomaly detection sub model and other anomaly detection sub model to one cluster when the input data and the other input data is associated with each other, and the anomaly detection sub model may judge the input data as a normal data, and the other anomaly detection sub model may judge other input data as the normal data.

In an alternative exemplary embodiment, the logic for clustering the anomaly detection sub model based on a judging result for the input data of each anomaly detection sub model may include a logic for classifying one or more anomaly detection sub models that judges the input data as the normal data into one cluster.

In an alternative exemplary embodiment, the logic for generating an integrated anomaly detection sub model through integrating one or more anomaly detection sub models included in one cluster may include a logic for generating the integrated anomaly detection sub model through an ensemble of one or more anomaly detection sub models included in one cluster.

In an alternative exemplary embodiment, the logic for generating an integrated anomaly detection sub model through integrating one or more anomaly detection sub models included in one cluster may include a logic for generating the integrated anomaly detection sub model through removing at least some among one or more anomaly detection sub models included in one cluster.

In an alternative exemplary embodiment, the logic for generating an integrated anomaly detection sub model through integrating one or more anomaly detection sub models included in one cluster may include a logic for generating the integrated anomaly detection sub model based on a performance teat for one or more anomaly detection sub models included in one cluster.

In an alternative exemplary embodiment, the logic for generating an integrated anomaly detection sub model through integrating one or more anomaly detection sub models included in one cluster may include a logic for generating the integrated anomaly detection sub model through retraining of one or more anomaly detection sub models included in one cluster.

According to an exemplary embodiment of the present disclosure, the logic for implementing the computing device may be implemented by a means, a circuit, or a module for implementing the computing device.

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application, but such implementation decisions should not be interpreted as causing a departure from the scope of the present disclosure.

Figure 7:
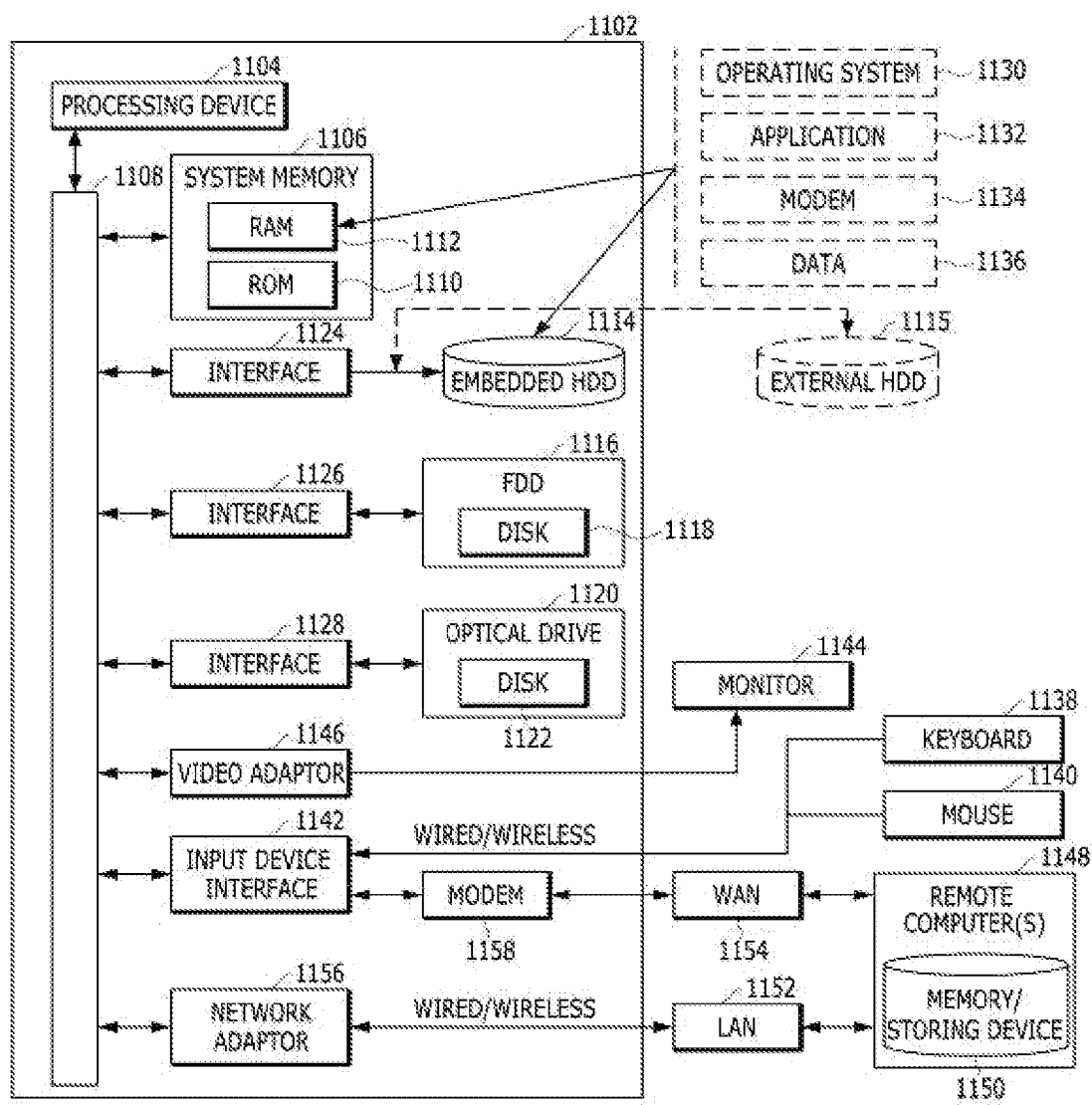
FIG. 7 is a simple and general schematic view of an exemplary computing environment in which exemplary embodiments of the present disclosure may be implemented.

FIG. 7 is a simple and general schematic view of an exemplary computing environment in which exemplary embodiments of the present disclosure may be implemented.

The present disclosure has generally been described above in association with a computer executable instruction which may be executed on one or more computers, but it will be well appreciated by those skilled in the art that the present disclosure can be implemented through a combination with other program modules and/or a combination of hardware and software.

In general, the program module includes a routine, a procedure, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Any medium accessible by a computer may be a computer readable medium, and the computer readable medium may include a computer readable storage medium and a computer readable transmission medium. The computer readable storage includes volatile and nonvolatile media and movable and non-movable media. The computer readable storage media include volatile and non-volatile media and movable and non-movable media implemented by a predetermined method or technology for storing information such as a computer readable command, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally include information transfer media that implement the computer readable command, the data structure, the program module, or other data in a carrier wave or a modulated data signal such as other transport mechanism. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting.

The RAM 1112 may also include a high-speed RAM including a static RAM for caching data, and the like.

The computer 1102 also includes an internal hard disk drive (HDD) 1114 (for example, EIDE and SATA)—the internal hard disk drive 1114 may also be configured for an external purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a server computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158, is connected to a communication server on the WAN 1154, or has other means that configure communication through the WAN 1154 such as the Internet, etc. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Further, various embodiments presented herein may be implemented as manufactured articles using a method, an apparatus, or a standard programming and/or engineering technique. The term "manufactured article" includes a computer program, a carrier, or a medium which is accessible by a predetermined computer readable device. For example, a computer readable medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information. The term "machine-readable media" includes a wireless channel and various other media that can store, possess, and/or transfer instruction(s) and/or data, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be analyzed within the widest range which is coherent with the principles and new features presented herein.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer program stored in a computer readable medium, wherein when the computer program is executed by one or more processors of a computing device, the computer program performs operations to provide methods for managing a model, and the operations comprise:
generating, by a processor, an anomaly detection model including a plurality of anomaly detection sub models having a pre-learned network function through using a plurality of training data subsets included in a training data set;
determining, by the processor, one or more anomaly detection sub models for calculating an input data among the plurality of anomaly detection sub models,
wherein the operation of determining one or more anomaly detection sub models for calculating an input data among the generated anomaly detection sub models includes an operation of determining one or more anomaly detection sub models for calculating the input data based on at least one of processing tendency of other input data for the plurality of anomaly detection sub models, context information of the input data, or cluster information of the input data;
judging, by the processor, whether or not anomaly exists in the input data through using the one or more anomaly detection sub model,
clustering a plurality of anomaly detection sub models, and
generating an integrated anomaly detection sub model through integrating one or more anomaly detection sub models included in one cluster.

2. The computer program according to claim 1, wherein the operation of determining one or more anomaly detection sub models for calculating an input data among the generated anomaly detection sub models includes an operation of determining the anomaly detection sub model for calculating the input data from the anomaly detection sub model that calculates other input data having predetermined relationships with the input data.

3. The computer program according to claim 2, wherein the other input data includes an input data generated before generating the input data and an input data generated within time interval predetermined with the input data.

4. The computer program according to claim 2, wherein the operation of determining the anomaly detection sub model for calculating the input data from the anomaly detection sub model which calculates other input data having predetermined relationships with the input data includes an operation of determining the anomaly detection sub model for calculating the input data from the anomaly detection sub model in which other input data having predetermined relationships with the input data is judged a normal data.

5. The computer program according to claim 1, wherein the operation of determining one or more anomaly detection sub models for calculating an input data among the generated anomaly detection sub models includes an operation of determining one or more anomaly detection sub model for calculating the input data from the anomaly detection sub model matching to the context information based on the context information of the input data.

6. The computer program according to claim 5, wherein the context information includes an information for associating the input data with a normal data, and at least one of a context indicator for associating the input data with at least one of a manufacturing recipe or a manufacturing equipment, a context characteristic indicator for associating with at least one of a manufacturing recipe characteristic or a manufacturing equipment characteristic, or a missing characteristic indicator including information for a missing characteristic of the input data.

7. The computer program according to claim 5, wherein the context information is matched to at least one of the input data or a training data, and
wherein the anomaly detection sub model is matched to the context information matching to the training data subsets.

8. The computer program according to claim 1, wherein the operation of determining one or more anomaly detection sub models for calculating an input data among the generated anomaly detection sub models includes an operation of clustering one or more other input data based on a similarity, and an operation of determining the anomaly detection sub model for calculating the input data from the anomaly detection sub model calculating other input data included in a cluster having the input data.

9. The computer program according to claim 1, wherein the operation of clustering a plurality of anomaly detection sub models includes an operation of clustering one or more anomaly detection sub models included the plurality of anomaly detection sub models based on at least one of a context information matched to each anomaly detection sub model, or an input data processing characteristic of each anomaly detection sub model.

10. The computer program according to claim 1, wherein the operation of clustering a plurality of anomaly detection sub models includes an operation of clustering the anomaly detection sub model based on a judging result for the input data of each anomaly detection sub model.

11. The computer program according to claim 10, wherein the operation of clustering the anomaly detection sub model based on a judging result for the input data of each anomaly detection sub model includes an operation of clustering the anomaly detection sub model and other anomaly detection sub model to one cluster when the input data and the other input data is associated with each other, and
wherein the anomaly detection sub model judges the input data as a normal data, and the other anomaly detection sub model judges other input data as the normal data.

12. The computer program according to claim 10, wherein the operation of clustering the anomaly detection sub model based on a judging result for the input data of each anomaly detection sub model includes an operation of classifying one or more anomaly detection sub models that judges the input data as the normal data into one cluster.

13. The computer program according to claim 1, wherein the operation of generating an integrated anomaly detection sub model through integrating one or more anomaly detection sub models included in one cluster includes an operation of generating the integrated anomaly detection sub model through an ensemble of one or more anomaly detection sub models included in one cluster.

14. The computer program according to claim 1, wherein the operation of generating an integrated anomaly detection sub model through integrating one or more anomaly detection sub models included in one cluster includes an operation of generating the integrated anomaly detection sub model through removing at least some among one or more anomaly detection sub models included in one cluster.

15. The computer program according to claim 1, wherein the operation of generating an integrated anomaly detection sub model through integrating one or more anomaly detection sub models included in one cluster includes an operation of generating the integrated anomaly detection sub model based on a performance teat for one or more anomaly detection sub models included in one cluster.

16. The computer program according to claim 1, wherein the operation of generating an integrated anomaly detection sub model through integrating one or more anomaly detection sub models included in one cluster includes an operation of generating the integrated anomaly detection sub model through retraining of one or more anomaly detection sub models included in one cluster.

17. A method for detecting anomaly of data using network function performed by one or more processors, comprising:

generating, by a processor, an anomaly detection model including a plurality of anomaly detection sub models having a pre-learned network function through using a plurality of training data subsets included in a training data set;

determining, by the processor, one or more anomaly detection sub models for calculating an input data among the plurality of anomaly detection sub models, wherein the operation of determining one or more anomaly detection sub models for calculating an input data among the generated anomaly detection sub models includes an operation of determining one or more anomaly detection sub models for calculating the input data based on at least one of processing tendency of other input data for the plurality of anomaly detection sub models, context information of the input data, or cluster information of the input data;

judging, by the processor, whether or not anomaly exists in the input data through using the one or more anomaly detection sub model, clustering a plurality of anomaly detection sub models, and generating an integrated anomaly detection sub model through integrating one or more anomaly detection sub models included in one cluster.

18. A computing device, including:
one or more processors; and
a memory storing commands executable in processor,
wherein the processor is configured to:
generate an anomaly detection model including a plurality of anomaly detection sub models having a pre-learned network function through using a plurality of training data subsets included in a training data set;
determine one or more anomaly detection sub models for calculating an input data among the plurality of anomaly detection sub models,
wherein the determining one or more anomaly detection sub models for calculating an input data among the generated anomaly detection sub models includes determining one or more anomaly detection sub models for calculating the input data based on at least one of processing tendency of other input data for the plurality of anomaly detection sub models, context information of the input data, or cluster information of the input data;
judge whether or not anomaly exists in the input data through using the one or more anomaly detection sub model,
clustering a plurality of anomaly detection sub models, and
generating an integrated anomaly detection sub model through integrating one or more anomaly detection sub models included in one cluster.

19. The computing device according to claim 18, wherein the determining one or more anomaly detection sub models for calculating an input data among the generated anomaly detection sub models includes determining one or more anomaly detection sub models for calculating the input data from the anomaly detection sub model matching to the context information based on the context information of the input data.

* * * * *